UNITED STATES PATENT OFFICE.

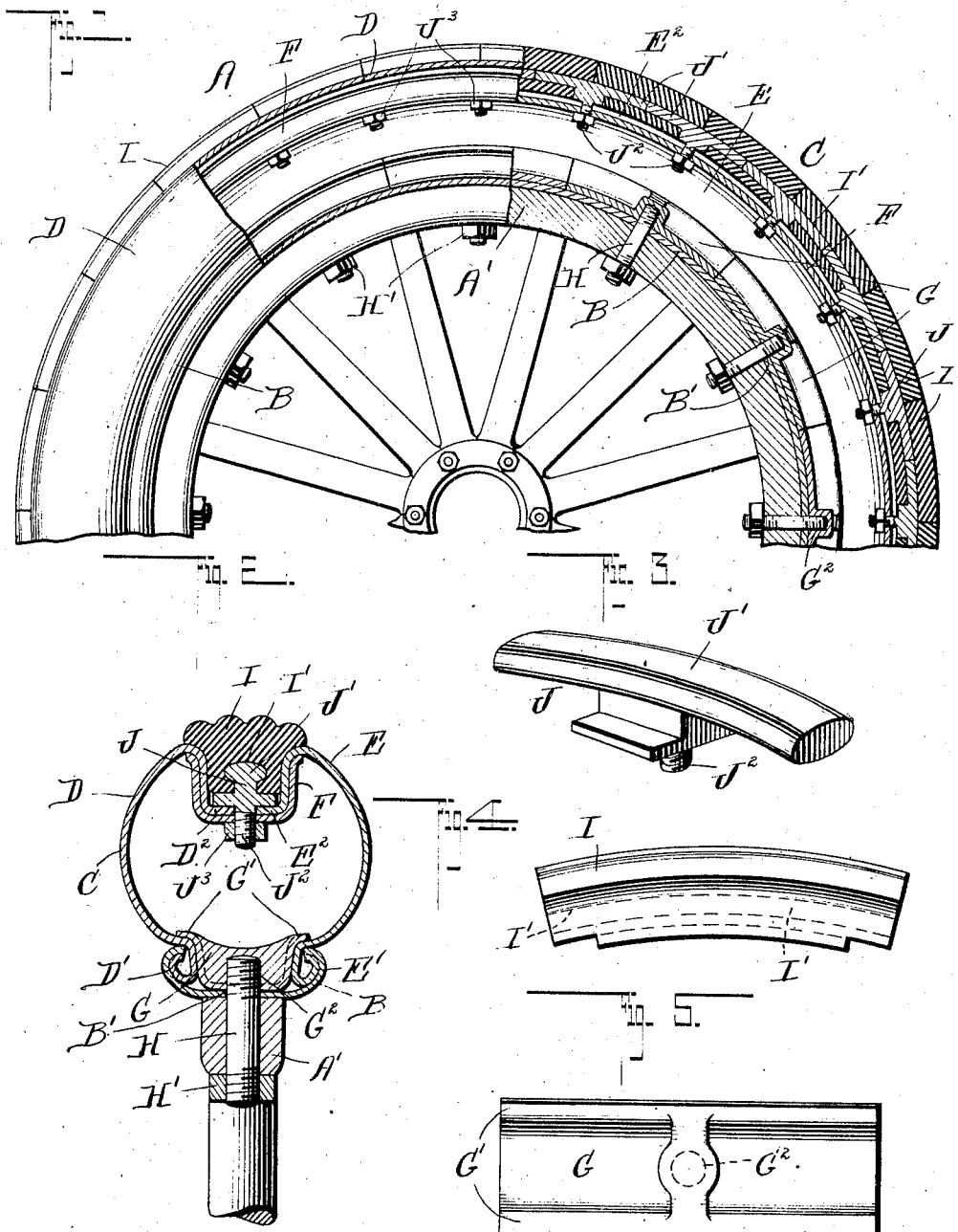

GEORGE E. TOMLINSON, OF WINCHESTER, KENTUCKY.

AUTOMOBILE-TIRE.

990,609.

Specification of Letters Patent.

Patented Apr. 25, 1911.

Application filed March 19, 1910. Serial No. 550,453.

*To all whom it may concern:*

Be it known that I, GEORGE E. TOMLINSON, a citizen of the United States, residing at Winchester, in the county of Clark and State of Kentucky, have invented a new and useful Improvement in an Automobile-Tire, of which the following is a specification.

This invention relates to certain new and useful improvements in automobile tires, the object being to provide a resilient tire formed of spring metal with a rubber tread, whereby a tire is formed which will have all of the resilient powers of a pneumatic tire.
A further object of my invention is to provide a tire which is so constructed that the same can be readily used in connection with any of the well known makes of wheels using a clencher rim, thereby enabling the tire to be readily attached to the wheels of an automobile.

Another object of my invention is to provide a tire which is formed of a plurality of resilient ring sections so connected together that they will be held in their proper positions without any danger of the sections becoming detached from one another or from the rim of the wheel.

A still further object of my invention is to provide a tire with an elastic tread which serves to cushion the vibration to a certain extent and deaden the noise.

With these and other objects in view, the invention consists in the novel features of construction, combination and arrangement of parts, hereinafter fully described and pointed out in the claims.

In the drawing forming a part of this specification:—Figure 1 is a side elevation of a portion of the wheel partly in section showing the construction of my improved tire. Fig. 2 is a transverse section through the same. Fig. 3 is a perspective view of the tread fastening member. Fig. 4 is a perspective view of one of the tread sections. Fig. 5 is an inverted plan view of the member for fastening the section to the clencher rim.

Referring to the drawing A indicates an automobile wheel having a felly A' and a clencher rim B, of the ordinary construction now in use, said rim and felly being provided with registering openings B' to receive fastening members for securing my improved tire C in position on the rim, as will be hereinafter fully described. The tire C comprises a pair of ring sections D and E formed of suitable spring steel and may be formed in a continuous ring or in sections, and are provided with hooked flanges D', E', adapted to coact with the flanges of the clencher rim and with annular depending flanges D², E² terminating in horizontal portions adapted to contact with each other and to fit within a ring member F which is substantially U-shaped in cross section and said ring may be formed of a continuous ring, or in sections according to how the ring sections D and E are formed. The ring sections D and E are concaved annularly, or formed substantially semi-circular in cross section, as clearly shown.

For securing the flanges of the ring members D and E under the flanges of the clencher rim, I provide fastening members G which are adapted to fit down between the flanges of the ring sections and are provided with laterally projecting flanges G', which extend over the lower portions of the ring sections, as clearly shown. The fastening members G are provided with threaded bores G² adapted to register with the openings of the rim and through which is adapted to pass a threaded bolt H which works in the threaded bore, and is clamped by a nut H', and it will be seen by this construction the ring sections will be securely locked to the rim without any danger of becoming accidentally detached.

Arranged within the central annular groove formed by the depending flange portion of the ring sections D and E, is an elastic tread I which may be formed of rubber or any suitable elastic fabric, and is provided with an annular substantially T-shaped groove I', in which the T-shaped heads J' of clamping members J are adapted to fit for securing the tread in position, and said members are provided with bolt portions J², which extend through the flanges of the ring members D and E, and the channel ring F are secured by nuts J³ and it will be seen that these members secure the meeting edges of the ring sections within the channel ring, and the tread in position in such a manner that it will be impossible for the parts to become detached after once being secured in position without loosening the nuts.

While I have shown and described a tire especially constructed to be used in connection with a clencher rim, it is of course understood that by changing the shape of the spring members the tire could be used on any other kind of rim desired without departing from the spirit of my invention.

Having fully described my invention, what I claim as new and desire to secure by Letters Patent is:—

1. A resilient tire comprising a pair of convex spring steel annular ring sections substantially semicircular in cross section, said sections having annular depending flanges at their upper edges terminating in horizontal abutting portions forming an annular groove, a substantially U-shaped annular ring arranged over said flanges, clamping members arranged in said groove extending through said rings provided with T shaped heads, and an elastic tread having a T shaped groove arranged within the groove of said sections, the heads of the clamping members extending into the groove of the tread.

2. In a resilient tire, the combination with a pair of spring ring members having flanges coacting with the flanges of the clencher rim of the wheel, means for securing said rings to said rim, said rings having annular depending flanges terminating in horizontal portions forming a central groove, a channel ring adapted to receive said flanges, an elastic tread having an annular groove in its underside arranged in the groove of said sections, and clamping members arranged in said grooves for securing said flange portions of said ring sections in the channel ring, said members having heads fitting within the groove of the tread for holding said tread in position.

GEORGE E. TOMLINSON.

Witnesses:
B. R. JANETT,
C. C. PAGE.